UNITED STATES PATENT OFFICE 2,565,463

CARBONYLATION OF ARYL HALIDES

Georges E. Tabet, Wilmington, Del., assignor to E. I. du Pont de Nemours and Company, Wilmington, Del., a corporation of Delaware No Drawing. Application May 28, 1949, Serial No. 96,138

5 Claims. (Cl. 260—515)

This invention relates to an improved process for carbonylation of organic halides, including aryl halides, such as monochlorobenzene, dichlorobenzenes and related compounds. The specific improvement to which the present invention is directed relates to the use of certain modifiers, which have a beneficial effect upon the carbonylation reaction.

The term "carbonylation," as employed herein, means the introduction of C=O into an organic molecule.

The carbonylation of an aryl halide, e. g. dichlorobenzene in the presence of acetic acid as "modifier," may be illustrated as follows:

$ClC_6H_4Cl + CO + 2CH_3COOH \longrightarrow$

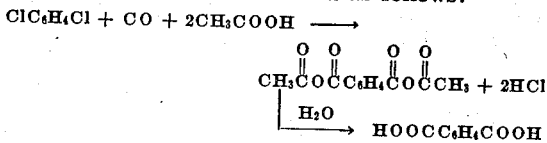

$\xrightarrow{H_2O} HOOCC_6H_4COOH$

When the dichlorobenzene which is employed is para-dichlorobenzene the carbonylation product is terephthalic acid, or an anhydride thereof, or intermediates which, if desired, can be converted readily to terephthalic acid.

Carbonylation of organic halides in the presence of certain specific catalysts (generally of the Friedel-Crafts type) have been known heretofore (Thomas, Anhydrous Aluminum Chloride in Organic Chemistry, Reinhold Publishing Corp., New York, N. Y., 1941, page 767; Arch. Pharm. 265, 187–95 (1927); Anales soc. espan. fis. quim. 27, 663–7 (1929); German Patent 537,610; U. S. Patents 2,003,477, 2,053,233, 2,062,344, 2,378,048, 2,411,982; British Patents 547,101 and 581,278; copending application S. N. 14,384, filed September 1, 1948).

An object of the present invention is to provide an improved catalytic process for carbonylation of organic halides, including aryl halides. Other objects of the invention will appear hereinafter.

The present invention provides a novel method for carbonylation of organic halides, by the use of nickel carbonyl or a similar metal carbonyl as an agent which assists or effects the carbonylation reaction in the presence of a carboxylic acid, e. g., an alkanoic acid.

Whether the metal carbonyl is considered as acting catalytically, or as an active carbon monoxide carrier, or as a reactant, or a substance which generates a transitory active agent, is not necessarily known, and such theoretical considerations are not intended to limit the invention in any way.

The invention, in particular embodiments, is directed to the carbonylation of aryl halides having chlorine, bromine or iodine attached directly to an aromatic nucleus, e. g. a benzene nucleus or a naphthalene nucleus. Suitable reactants include monochlorobenzene, dichlorobenzenes, trichlorobenzenes, polychloronaphthalene, etc., and their bromine and iodine analogs. The carboxylic acid reactants include the alkanoic acids, such as acetic, propionic, succinic, adipic, stearic and palmitic acids.

The metal carbonyl which is employed may be introduced as such into the reaction mixture, or may be produced in situ. It is generally preferred to introduce the acids into the reaction mixture as such, but it is also possible to introduce esters thereof, e. g. methyl formate. When esters are introduced in place of acids, however, new effects are sometimes observed, and the reaction sometimes leads to the formation of other esters, rather than anhydrides or free acids.

The metal carbonyls which may be employed in the practice of the invention are carbonyls of metals which are members of the iron sub-group, namely iron, nickel and cobalt.

It is usually desirable to employ at least about one mol of metal carbonyl per equivalent of the C-halogen group reacting. In a continuous process this can be accomplished by continuously replenishing the metal carbonyl to make up for any losses caused by reaction or by thermal decomposition; thus, if the process is operated continuously, the quantity of nickel carbonyl which is introduced or which may be generated per unit of reaction time should be preferably at least one mol per mol of C-halogen group reacting. In batchwise operation it is preferable to employ initially at least one equivalent (0.25 mol) of nickel carbonyl per equivalent of C-halogen group reacting. This, of course, is not intended to imply that an excess of the organic halide cannot be present, but rather that the number of equivalents of C-halogen group undergoing reaction may be limited by the number of available equivalents of nickel carbonyl. Relatively small quantities of nickel salts, such as nickel chloride, therefore are not highly effective. Reaction mixtures containing from 0.25 to 2.5 mols of metal carbonyl per equivalent of C-halogen give the best results.

The carbonylation of organic halides in accordance with this invention takes place relatively slowly at temperatures below about 200° C. It is therefore generally preferred to carry out the reaction at a temperature within the range of about 250° to 350° C. Best results are obtained when superatmospheric pressures are employed, preferably pressures within the range of about 50 to 1500 atmospheres.

Any convenient or suitable apparatus may be used in the carbonylation of organic halides according to the process of this invention. In batchwise operation pressure-resistant autoclaves made of or lined with relatively inert metals, such as stainless steel, silver, copper, etc., may be employed advantageously. In continuous operation tubular reaction vessels may be employed and, if desired, the reactants may be introduced at more than one point along the tubular reaction vessel. Similarly the metal carbonyl, or a substance which produces metal carbonyl under the reaction conditions, may be injected at one or more points along a tubular reaction vessel, if desired.

Any suitable method may be employed for separating the carbonylation products from the reaction mixture obtained in the practice of the invention. The carboxylic acids, which in particular embodiments are formed by the action of water on the carbonylation products, in general can be separated from the reaction mixture by steam distilling any volatile products which may be present and recovering relatively insoluble acid from the residue.

For reasons of economy, it is frequently desirable to recover all of the metal, e.g. nickel, recycle the same as metal carbonyl, along with additional quantities of the halide reactant.

While carbon monoxide may be present in the reaction mixture, it should be understood that the introduction of carbon monoxide from an external source is not always necessary, since carbon monoxide which is combined with the nickel carbonyl is also effective in the carbonylation reaction.

The invention is illustrated further by means of the following examples.

*Example 1.*—A mixture consisting of 26 grams p-chloro-toluene, 36 grams nickel carbonyl and 100 cc. glacial acetic acid is heated at 300° C. for two hours in a stainless steel vessel under an autogenously developed pressure of 300 atmospheres. The reaction vessel is emptied, washed with benzene, and the washes are combined with the reaction product. The resulting mixture is filtered, and the filterate is distilled, yielding recovered solvent, and no unreacted p-chloro-toluene. The distillation heel weighs 23.7 grams; this corresponds to an 87% yield of p-toluic acid, based on the p-chlorotoluene charged. This crude carbonylation product is dissolved in dilute aqueous alkali and the solution is heated with charcoal to absorb impurities. The mixture thus obtained is filtered, and the resulting filtrate is acidified; this causes the precipitation of p-toluic acid. The weight of purified p-toluic acid thus obtained is 12.4 grams. A similar result is obtained when the experiment is repeated using cobalt carbonyl or iron carbonyl in place of nickel carbonyl.

*Example 2.*—A mixture consisting of 47 grams p-dibromobenzene, 36 grams nickel carbonyl and 100 cc. isobutyric acid is heated at 300° C. for 2 hours in a stainless steel vessel under a carbon monoxide pressure of 500 atmospheres. The resulting mixture is steam distilled for removal of volatile ingredients, whereupon terephthalic acid is obtained in high yield as an insoluble precipitate.

It is to be understood that the foregoing examples are illustrative only and that they are not intended to limit the scope of the invention in any way. Numerous methods for modifying the illustrated procedure will be apparent to those who are skilled in the art. For example, various acceptors for the hydrogen halide which may be generated when the carbonylation is carried out in an aqueous system may be introduced if desired. Water is usually avoided as one of the ingredients of the reaction mixture. The unreacted organic halide may, of course, be recovered and recycled. This is true also of the intermediate reaction products, such as the monochlorobenzoic acids. It is my intention that such changes and modifications to the extent that they are within the scope of the appended claims shall be considered as part of my invention.

I claim:
1. The method for carbonylation of compounds having a halogen atom of the class consisting of chlorine and bromine attached to an aromatic nucleus which comprises carrying out the said carbonylation reaction in the presence of a carbonyl of a metal of the iron sub-group and a substantially anhydrous alkanoic acid said process being carried out without introduction of water.

2. The method for carbonylation of aryl halohydrocarbons having a member of the class consisting of chlorine and bromine attached directly to a benzene nucleus which comprises carrying out the said carbonylation reaction in the presence of nickel carbonyl and a substantially anhydrous alkanoic acid said process being carried out without introduction of water.

3. The method of claim 2, in which the said halohydrocarbon is a para-dihalobenzene.

4. The method of claim 2, in which the said halohydrocarbon is para-chlorotoluene.

5. In a process for carbonylation of a para-dihalobenzene in which the halogen atoms are members of the class consisting of chlorine and bromine, the steps which comprise heating said para-dihalobenzene with nickel carbonyl and a substantially anhydrous alkanoic acid having from 2 to 4 carbon atoms per molecule, at a temperature of 250° to 350° C. under a pressure within the range of 50 to 1500 atmospheres, whereby a carbonylation product is formed, thereafter converting the said product to terephthalic acid by the action of water, and recovering terephthalic acid from the resulting mixture said process being carried out without introduction of water.

GEORGES E. TABET.

REFERENCES CITED

The following references are of record in the file of this patent:

UNITED STATES PATENTS

| Number | Name | Date |
| --- | --- | --- |
| 2,053,233 | Woodhouse | Sept. 1, 1936 |
| 2,062,344 | Wiezevich et al. | Dec. 1, 1936 |
| 2,084,284 | Scott | June 15, 1937 |
| 2,411,982 | Theobald | Dec. 3, 1946 |

FOREIGN PATENTS

| Number | Country | Date |
| --- | --- | --- |
| 308,666 | Great Britain | June 5, 1930 |
| 448,884 | Belgium | Feb. 1943 |
| 581,278 | Great Britain | Oct. 7, 1946 |
| 621,520 | Great Britain | Apr. 11, 1949 |

OTHER REFERENCES

Du Pont, Chem. Abstracts, vol. 31, col. 6838 (1937).

Reppe: Fiat Final Report #273 (by Peck et al.), Oct. 2, 1945, pp. 8–12.